June 11, 1940.  J. HUGHES  2,204,084

JOCKEY PULLEY

Filed June 24, 1938

Inventor:
John Hughes

By his Attorneys:- Pennie Davis Marvin & Edmonds

Patented June 11, 1940

2,204,084

UNITED STATES PATENT OFFICE 2,204,084

JOCKEY PULLEY

John Hughes, Rochdale, England

Application June 24, 1938, Serial No. 215,648
In Great Britain June 26, 1937

3 Claims. (Cl. 308—18)

This invention relates to improvements in jockey pulley assemblies, particularly for use in textile frames, e. g., for engagement with a tape driven by a tin roller in a spinning or twisting frame.

A jockey pulley assembly according to the invention includes a pulley proper unitary with a hollow hub accommodating an anti-friction bearing the outer race of which is secured within the hub for rotation therewith, and the inner race of which is secured on a stub-shaft terminating within the hub and adapted to be secured exteriorly of the pulley in a pulley-supporting bracket-arm or the like by a nut the pressure exercised by which clamps the inner race, the stub-shaft, and the bracket-arm or the like solidly together.

Figure 1:
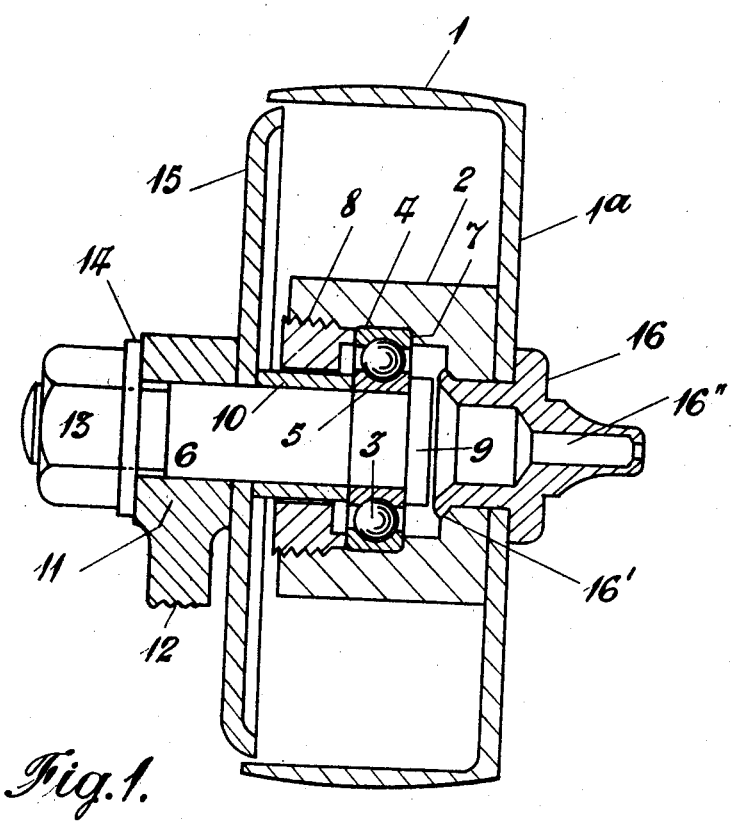
Figures 2, 3:
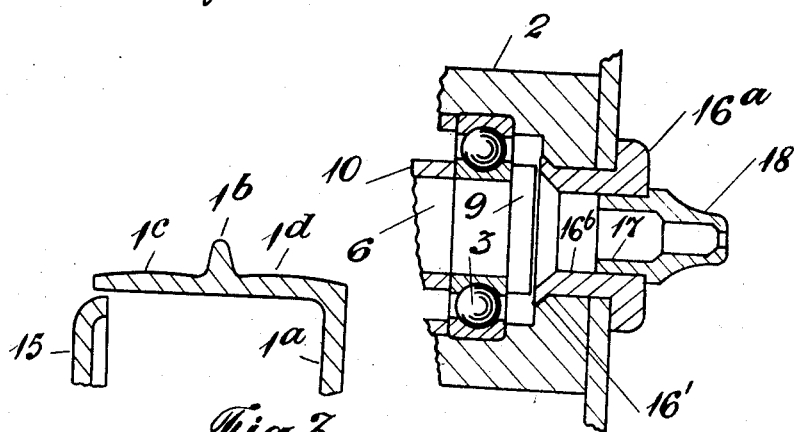

Description will now be given of a jockey pulley assembly constructed according to the invention, reference being made to the accompanying drawing in which Fig. 1 is an axial section of a jockey pulley assembly and Figs. 2 and 3 are fragmentary sectional views of modifications later to be described.

Referring to Fig. 1, 1 indicates the pulley proper of dished form attached to a hollow hub 2 accommodating a ball bearing 3 the outer race 4 of which is secured within the hub 2 for rotation therewith, and the inner race 5 of which is secured on a stub-shaft 6 terminating within the hub and extending exteriorly of the pulley through the rear end of the hub. The outer race 4 is interposed endwise between an annular abutment shoulder 7 formed in the hub 2 and an annular nut 8 screw-threaded into the rear end of the hub. The inner race 5 is interposed endwise between a collar 9 on the inner end of the shaft 6 and a spacer tube 10 surrounding the shaft 6. The shaft 6 is secured exteriorly of the pulley in a boss 11 of a pulley-supporting bracket-arm 12 by a nut 13 screw-threaded on the outer end of the shaft 6 and abutting, with the interposition of a washer 14, on the boss 11. 15 denotes a pulley dust cover strung on the shaft and interposed between the boss 11 and the spacer tube 10.

As will be understood, the construction is such that the components 5, 6, 10, 11 and 15 are clamped solidly together by the pressure exercised by the nut 13.

The pulley 1 is attached to the hub 2 by a flanged bush 16 axially penetrating the web 1ª of the pulley and the hub 2, the metal at the inner end of said bush 16 being pressed over at 16' to secure the parts firmly together. The bush 16 is formed integrally with a lubricating nipple 16″ which is engageable by a lubricant gun or the like for the purpose of injecting lubricant for the ball bearing into the interior of the hub.

According to a modification, instead of being integral with the bush 16, the lubricating nipple may be separate, and, as shown in Fig. 2, the bush 16ª is formed with a cylindrical bore 16ᵇ serving as a socket for the reception of the spigot 17 of a lubricating nipple 18; or the lubricating nipple 18 may be screw-threaded to engage a screw-threaded part in said bush.

In the further modification illustrated in Fig. 3 the pulley proper is provided on its periphery with a centrally disposed rib 1ᵇ with a cambered surface 1ᶜ, 1ᵈ respectively on either side of said rib, the construction being adapted to keep the driving tape running in the correct position. The central rib enables the jockey pulley to be run in either direction and the position of the tape is controlled, thus preventing it from slipping off when the pulley is reversed for warp or weft way.

Manifestly, the construction is such that the pulley may be assembled or dismantled with the minimum of labour and skill, and the components are all of simple design so that replacements will be readily obtainable.

I claim:

1. A jockey pulley assembly adapted to be attached to a supporting bracket, and including, in combination, a pulley proper of dished form having an integral web, a hollow hub formed separately from and rotatable with said pulley proper, said hub housed within said pulley proper with its inner face abutting on the inner face of said web, a combined flanged bush and lubricating nipple axially penetrating said web and the adjacent end of said hub, said bush having a flange abutting on the outer base of said web and the inner end of said bush being pressed over to engage said hub, whereby to secure firmly together said pulley proper and said hub, a stub-shaft terminating within said hub, an inner bearing race removably held on said shaft, an outer bearing race, means engaging said hub removably holding said outer race within said hub, anti-friction bearing elements accommodated between said races, a spacer tube surrounding said shaft and adapted to abut at its inner end on said inner race, a dust cover strung on said shaft and interposed between said bracket and said spacer tube, and a nut on the outer end of said shaft for clamping solidly together said shaft, said inner race, said spacer tube, said dust cover, and said bracket.

2. A jockey pulley assembly as claimed in claim 1 in which the outer race is solidly held against a shoulder on the hub by means of a removable nut screw-threaded into the bore of the hub with its inner end abutting against the outer race.

3. Jockey pulley assembly as claimed in claim 1 in which the pulley proper is provided on its periphery with a centrally located rib and with a cambered surface on each side of said crib.

JOHN HUGHES.